Nov. 9, 1926.

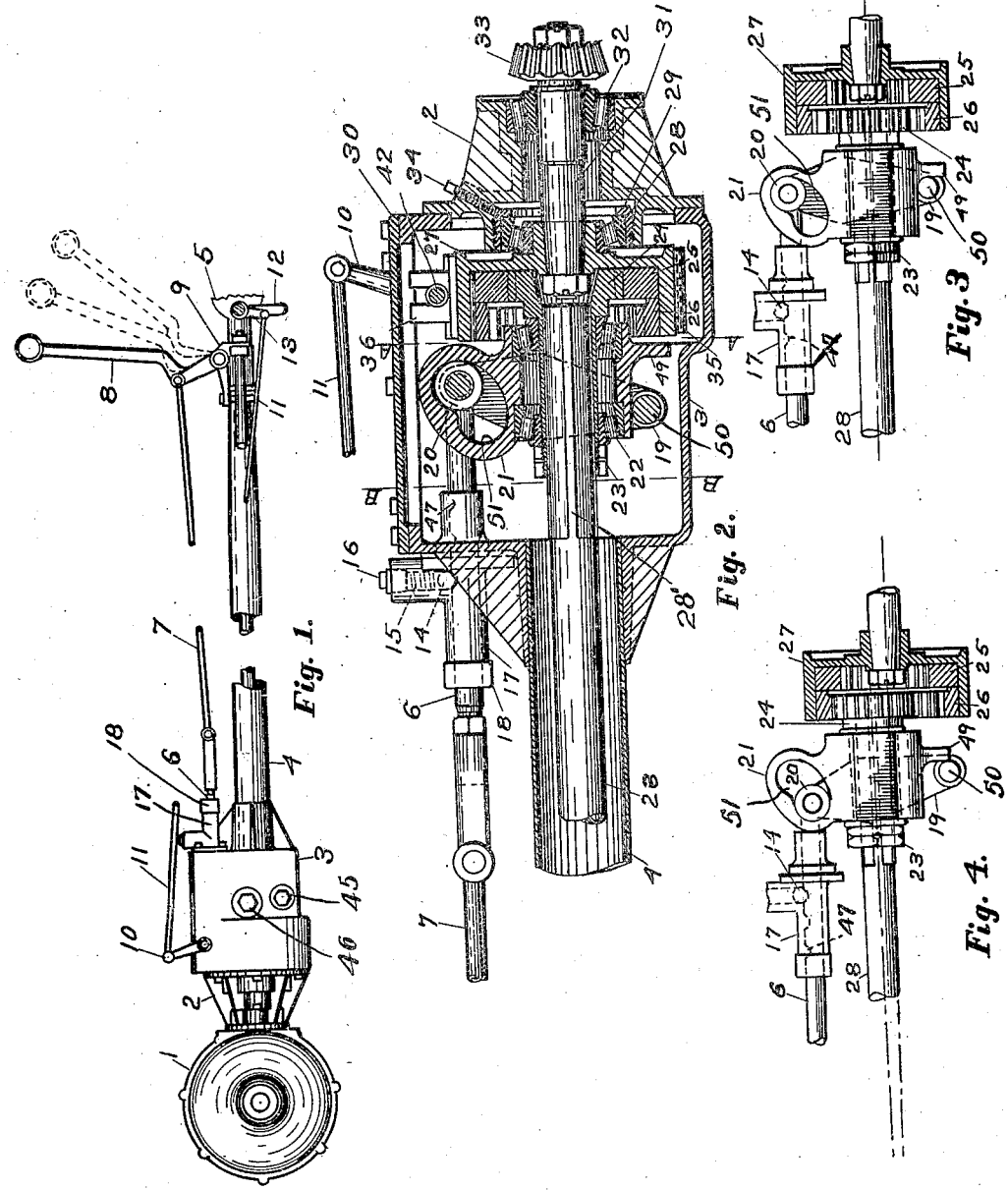

J. F. McNUTT 1,605,967

AUXILIARY TRANSMISSION FOR MOTOR VEHICLES

Filed April 23, 1925    2 Sheets-Sheet 2

INVENTOR:
J. F. McNutt,
BY H. L. Woodward,
ATTORNEY.

Patented Nov. 9, 1926.

1,605,967

UNITED STATES PATENT OFFICE.

JOHN F. McNUTT, OF GLENDALE, CALIFORNIA.

AUXILIARY TRANSMISSION FOR MOTOR VEHICLES.

Application filed April 23, 1925. Serial No. 25,365.

The invention relates to improved transmission devices, especially suitable to use in motor vehicles, for effecting changes of speeds relatively between the power shaft and the driven shaft or axle. The invention effects this by novel utilization of an oscillatable shaft, driving pinion and internal gear, to the end that special advantages are attained in my device, enabling its ready utilization with a minimum of difficulty, as well as attaining special functional advantages, overcoming numerous objections to prior devices in which an oscillatable shaft, pinion and internal gears have been employed.

A further special object of my invention is to provide an embodiment adapted to use as an auxiliary transmission in certain motor vehicles of well known type, the need for which auxiliary is well understood in the art.

An important attainment of the invention consists in enabling the lateral movement and also longitudinal shifting of the gear with a single control lever in a novel and efficient manner, adapting the device to sustain the stresses or drive and torque with a minimum liability of failure or excessive friction and wear. A further aim is to provide a novel construction of mounting for a laterally and longitudinally reciprocable gear. A further aim is to provide a novel construction of brake applicable to use in devices of this kind. A still further object is to present a novel mounting for a gear shift lever suitable for use upon auxiliary transmissions of this character.

Additional objects, advantages and features of invention reside in the details of construction, and the combination and relative arrangement of parts, as will be readily understood from the following description and accompanying drawings, wherein—

Figure 1 is an elevational view of the drive shaft housing or tube and differential housing upon which my invention has been incorporated.

Figure 2 is an enlarged longitudinal sectional view of the mechanism while in high speed position.

Figure 3 is a view of the gears and mounting only, in neutral position, while

Figure 4 is a view similar to Figure 3 showing the parts in low speed position.

Figure 5:
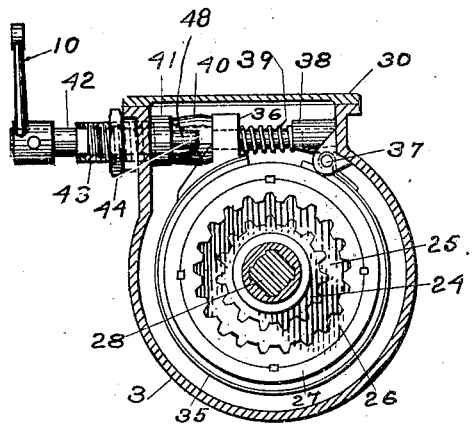
Figure 5 is a cross sectional view on the line A—A of Figure 2.
Figure 6:
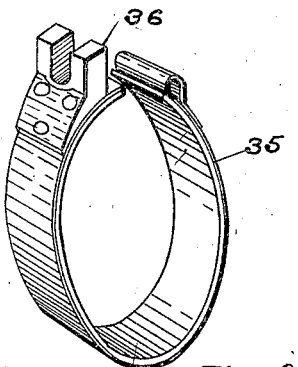
Figure 6 is a detail of the brake band section.
Figure 8:
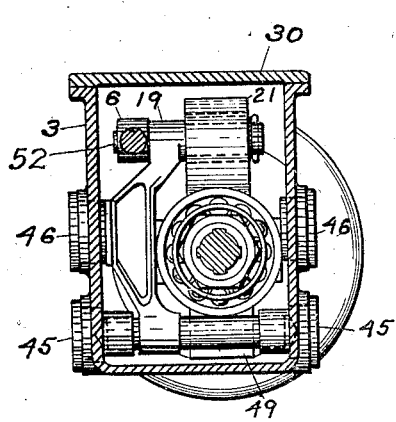
Figure 8 is a cross section on the line B—B of Figure 2.
Figure 7:
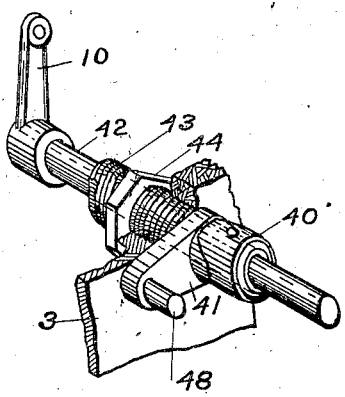
Figure 7 is a fragmentary perspective of the mounting of the brake shaft and adjusting means.
Figure 9:
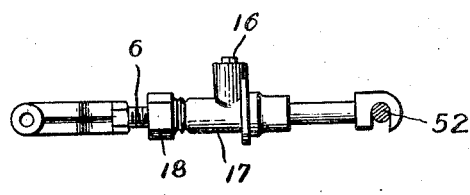
Figure 9 is a perspective view of a portion of the gear-shifting means.

The structure with which my invention is used as an auxiliary includes, as is well known, a differential housing 1, a power or drive shaft 28, and a drive shaft housing or tube 4, as shown in Figure 1, usually supported at the rear end on a drive shaft roller bearing housing, not shown, which is abutted against a suitable machined face on the differential housing. My invention as embodied here includes a bearing housing 2 which is substituted for the ordinary drive shaft roller bearing housing, and also a case 3 secured to the bearing housing 2, the case having a forward sleeve extension in which the rear end portion of the drive shaft housing 4 may be brazed or otherwise secured after being cut off or othewise shortened, as required. In place of the ordinary shaft of regular equipment, I provide a correspondingly shortened drive shaft 28 as shown in Figure 2, having splines upon the rear end and extending a suitable distance.

The usual bevelled driving pinion 33 is keyed upon the rear end of a driven shaft 31, which is mounted in the bearing housing 2 by means of a roller bearing 32 of ordinary form at the rear part, and an adjustable bearing at the forward part, the cone element of which is mounted upon the hub of a drum 27, which is keyed upon the forward tapered end of the shaft 31, the race 28$^a$ of the last named bearing being mounted in an adjusting sleeve 29, suitably threaded and screwed into a cylindrical flange at the forward side of the housing 2, being secured in adjusted positions by a lock screw 34 engaged through the housing 2 from the outside. The drum includes a head portion substantially planiform and in a plane at right angles to the axis of the shaft 31, and a wall portion which is cylindrical and smoothly finished inside and out. A brake is provided, acting upon this drum, including a suitably faced metal band 35 pivotally supported at one end between ears 37 within and upon the case, the opposite end of the band being provided with a vertically slotted upstanding lug 36 in which is laid the brake shaft 42 supported at its inner end in a bossed bearing 38 formed on the case, being projected through the opposite side of the case where it is supported in a sleeve 43 externally threaded and screwed into the side of the case, projected inwardly to engage a cam 41 supported revolubly on the shaft and having a lateral arm receiving a stud 48 slidable therethrough by which the cam is prevented from turning, the stud being carried by the case. A lock nut 44 is provided on the sleeve 43. A cam sleeve 40 is pinned upon the shaft to cooperate with the cam 41, having a plane face engaged with the lug 36 whereby the thrust produced by rotation of the shaft is communicated to the brake band. An arm 10 is pinned to the shaft 42 which may be connected by the brake rod 11 to one of the usual brake operating appliances of a motor vehicle, in the present instance being shown connected to the arm 13 of the usual brake lever shaft 12, the brake lever being omitted from the views.

Small and large internal gears 25 and 26 are provided within the drum 27, having a pressed fit therein and being keyed therein in any familiar way, the smaller gear being next to the head of the drum or at the rear, and having teeth of the same pitch, approximately, although the smaller gear does not require to have hypocycloidal form, as it is intended to serve solely as a clutch to receive snugly a spur driving gear 24. The gear 24 is longitudinally slidable on the splined portion of the shaft 28, being shown as formed with an integral sleeve extended forwardly therefrom and fitted to the shaft. This gear supports the rear end of the shaft 28 and is itself in turn mounted in a carriage 21 supported for longitudinal and vertical reciprocation, as will appear. The gear sleeve is mounted in the carriage by means of roller bearings 22 of ordinary form, one at the rear side of the carriage, and the other at the forward side, the sleeve projecting forwardly a short distance beyond the cone element of the forward bearing 22, being externally threaded and provided with adjusting and lock nuts 23 by which compensation for wear may be effected as required. The lever 19 is supported on a horizontal shaft 50 extending transversely through the lower part of the case 3 and this shaft serves as a rest for the carriage at the rearward and lower limit of its movement, as shown in Figure 2. Forward movement of the carriage is limited by means of a lug 49 formed on the lower part thereof which will strike the shaft 50, the lug being extended downwardly a distance to continue in engagement with the shaft 50 when the carriage is raised, as will be described. The carriage is provided at its upper side with an integral vertical extension having a cam slot 51 therethrough having the upper rear and lower forward lobular portions. The lever 19 is provided with a lug or pin extending transversely through the slot 51 and having mounted thereon a roller or wiper 20 which is movable from one lobular portion of the slot 51 to the other and reverse. The forward side of the upper part of the slot has a slight slope forwardly and downwardly to its junction with the lower portion of the slot, as may be clearly seen in Figure 4, the purpose of which will be readily understood for the functioning of the device, as will be described. When the carriage is at the rear and lower limit of its movement, the roller 20 lies in the upper lobular part of the slot 51—not in supporting engagement, but on the contrary, a clearance is afforded by reason of which when the lever 19 is moved forwardly the carriage may slide upon the shaft 50 as before mentioned until the lug 49 engages that shaft. The lever 19 is moved by means of a shift rod 6, having a rear vertically slotted head receiving the outer end of the pin 52 upon which the roller 20 is carried. This rod is mounted in a bracket fitting 17, bolted on the forward side of the case 3, which is apertured to receive the rear end of the bracket therewithin. The rod 6 projects from the forward end of the bracket and a packing 18 is provided thereat to retain lubricant within the case properly. The bracket is formed with an upward extension bored and closed by a plug 16 screwed thereinto, which is utilized to retain a spring 15 bearing upon a ball 14 adapted to engage in respective notches 47 formed in the upper side of the rod 6 by which it may be held yieldingly in the different positions required in the operation of the device. The forward end of the rod 6 is provided with an adjustable yoke to which is connected the usual link or shift rod 7 extending from the gear shift hand lever 8, which is mounted upon a bracket 9 clamped upon the forward end of the tube 4.

The shaft 50 is supported in the case by means of adjustable sleeves 45 closed at their outer parts. It is important to note that the carriage 21 is formed on each side adjacent the level of the shaft 28 with vertical planiform bearing faces parallel to the axis of the shaft, and the lever 19 is similarly faced on each side at about the same level, so that its inner bearing face may rest snugly against the adjacent bearing face of the carriage. For accurate centering of the rear end of the shaft 28 and gear 24 with respect to the drum, plugs 46 are screwed through suitable bosses in the side of the case 3, these plugs having smoothly machined flat inner faces adapted to snugly abut the outer lateral face of the carriage, on one side, and the corresponding face of the lever 19 on the other, thereby preventing loose lateral horizontal movement of the parts within the case, and also enabling the parts to be very accurately centered.

It should be noted that the lower lobular portion of the slot 51 has its upper side located at such a height as to rest snugly upon the roller 20 when the carriage is at the forward upper limit of its movement, with the gear 24 snugly meshed with the upper portion of the large internal gear 26. The case 3 may be closed by a removable plate 30 bolted upon the top thereof, and it will be noted that all parts are of a character to be readily accessible and replaceable. Renewal of the brake-band may be effected without dismounting of the case or transmission parts, and adjustment of the brake may be effected without opening of the case or disturbance of any of the parts, except the sleeve 43 and the lock nut, rotation of which will effect the required adjustments. It will also be observable that all of the parts required are of a simple and practical form adapted to be produced readily by the utilization of ordinary shop practices and are liable in a minimum degree to breakage or excessive wear.

In the operation of this device, the lever 8 may be left constantly either in position for low speed drive or for high speed drive while the usual transmission of the vehicle in which it is installed is employed in the usual way. However, in case the regular transmission is of the planetary type, as is generally the case in the cars in which my appliance is ordinarily installed, a great deal of friction is involved which makes cranking of the motor difficult in cold weather and also affords great retardation of the movement of the car in coasting at which time my device may be permitted to remain in neutral. In case braking of the car is then required, the location of the brake device as shown in my invention is of special value in enhancing the safety of the vehicle, as is readily appreciated by those versed in current practice. Shift from low to high or from high to low gear in my device may be accomplished by my device while the vehicle is in motion by releasing the clutch of the regular transmission while the lever 8 is operated to effect the change of gear positions required.

With the parts as shown in Figure 2, which is high speed position, the lever 8 will be at the rearward limit of its movement. Upon movement of the lever 8 to the intermediate position dotted in Figure 1, the rod 6 will be drawn forward, moving the upper end of the lever likewise, and by the roller 20 engaging the forward side of the upper lobular portion of the slot 51 the carriage will be thrust forwardly, sliding upon the shaft 50 until checked by the lug 49, at which time the ball 14 will also engage the intermediate recess 47 of the rod 6, and these two together will tend to check further forward movement of the lever by holding the same until additional force is applied thereto. By such further movement of the lever 8 to the forward position dotted in Figure 1, the roller 20 is caused to bear against the forward inclined surface of the upper portion of the slot, and as forward movement of the carriage is now prevented by engagement of the lug 49 with the shaft 50, the effect will be to cause the roller 20 to lift the carriage and move to the lower forward extension of the slot 51, the upper side of which is approximately horizontal and will support the carriage in position with the gear 24 properly engaged with the gear 26. It will be seen by this that the limited space required for the movement of the gear 24 from the plane of one internal gear to the plane of the next is also utilized to effect the additional required movement to bring the gear 24 laterally into engagement with the larger internal gear, at the same time that it is made possible to retain the gear 24 in a central position in the larger gear disengaged from both gears in the drum.

Complicated movement or forms in any of the parts has also been avoided by this construction, and the parts required for the auxiliary installation of this kind reduced to a minimum, as well as enabling the production of the appliance in an extremely compact and light form, without sacrificing the requirements of sturdy and rugged strength which are so desirable in transmissions of this kind. Thereby the unslung weight is not objectionably augmented and undue strain on standard axles, wheels and tires is also avoided.

As is well known in such a construction, the drive shaft tube is provided with integral lateral ears at the forward part, by which radius rods of the rear running gear are secured ordinarily, and it will be noted in Figure 1 that the bracket 9 upon which the lever 8 is mounted, is provided with corresponding ears at its forward part alined with those of the tube 4, and receiving commonly the forward threaded end of the radius rod, as usual. The bracket extends rearwardly from this part over the tube, and an ordinary U-shaped clamping yoke is secured around the tube and through the bracket in a way familiar in such devices.

I claim:

1. In an apparatus of the character described, a laterally and longitudinally shiftable driving pinion including a bearing carriage movable therewith, and a driven member including gears alternatively engageable with the pinion at respective positions of the latter, an intermediate member movable in a fixed path, means to reciprocate the last named member in such path, a stop for the carriage at one limit of its longitudinal movement, cam and wiper elements being incorporated in said carriage and intermediate member respectively whereby certain cam parts will move the carriage by reciprocation of said intermediate member over a part of its path but so inclined that under stoppage of longitudinal movement of the carriage and movement of the intermediate member beyond said part of its path the cam portion will coact with the wiper under their relative movement to move the carriage laterally.

2. In apparatus of the character described, an oscillatable driven shaft, a gear having a sleeve in fixed relation thereto slidably splined on the shaft, said sleeve being exteriorly threaded at its extremity, a carriage for movement of the gear as required, roller bearings between the sleeve and carriage at opposite sides of the latter, and adjusting nuts on the extremity of the sleeve.

3. In apparatus of the character described, a case, a driven gear mounted on a fixed axis therein, a driving gear shiftable laterally and longitudinally, one of said gears having portions of different diameters to mesh with the other at different relative positions, a carriage for the shiftable gear including a cam part, a wiper movable in a path parallel to the neutral axis of the gears, said cam having a face inclined to the path, means to support the carriage slidably, and means to limit longitudinal movement of the carriage to less than that of the wiper in one direction.

4. In a device of the character described, a case, a carriage having reciprocal movement in two directions, means to move the carriage, and means to guide the carriage comprising bearing plugs screwed in the side of the case having planiform faces to guide the parts moving therebetween, means to move the carriage comprising a lever movable between the carriage and the bearing plug at one side, said lever having parallel sides and said carriage having parallel faces fitting snugly the lever and other plug.

In testimony whereof I affix my signature.

JOHN F. McNUTT.